Patented Jan. 23, 1945

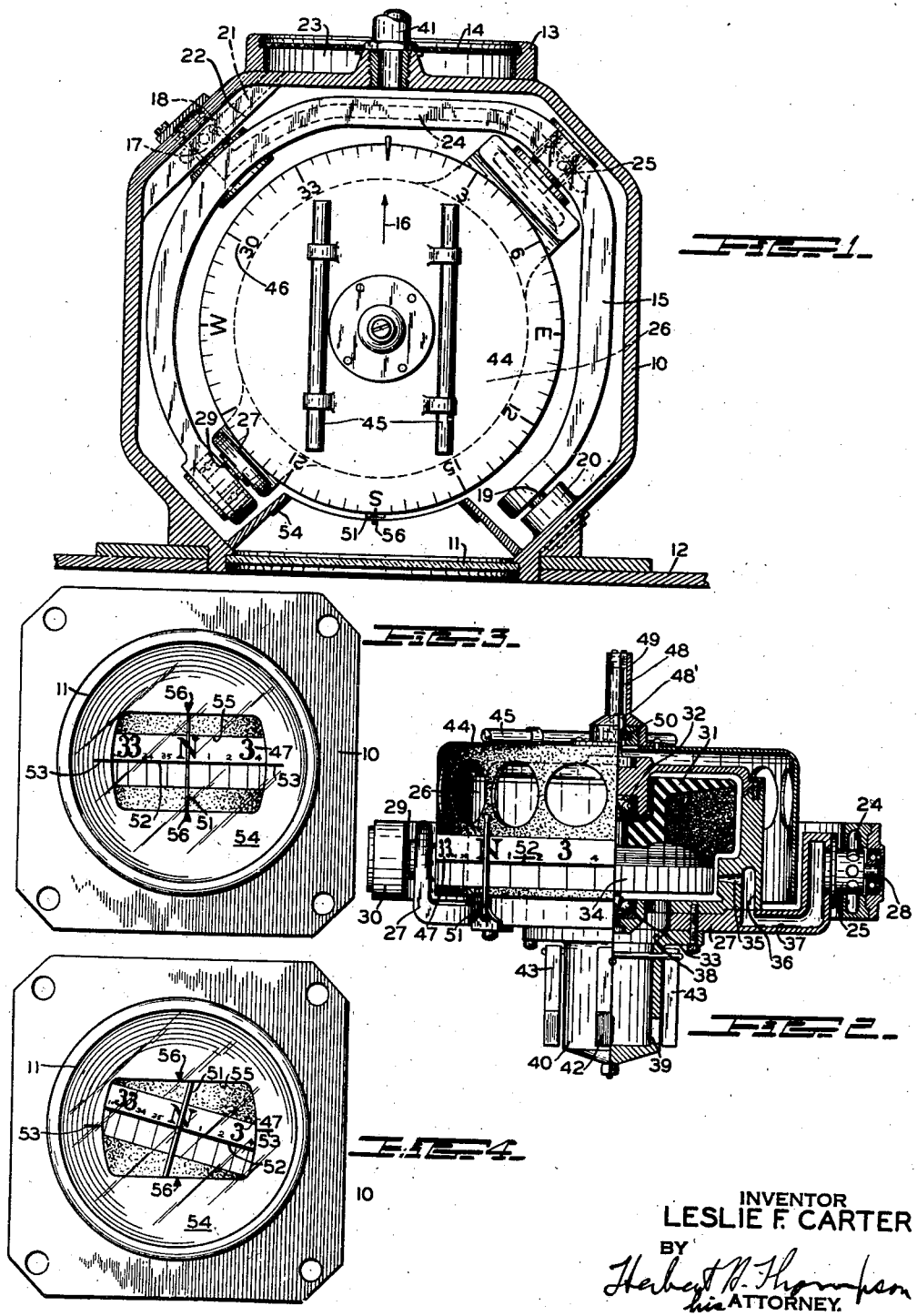

2,367,667

UNITED STATES PATENT OFFICE 2,367,667

FLIGHT INDICATOR FOR AIRCRAFT

Leslie F. Carter, Leonia, N. J., assignor to Sperry Gyroscope Company, Inc., Brooklyn, N. Y., a corporation of New York Application May 27, 1942, Serial No. 444,659

10 Claims. (Cl. 33—204)

This invention relates generally to flight indicators for aircraft and more especially concerns a particular combination of artificial horizon and magnetic compass device in a unitary instrument. In the preferred embodiment of the invention, the improved instrument provides a bank and pitch attitude indication of the craft and also gives an indication of the craft's heading in azimuth. While the gyro vertical of the instrument is primarily adapted to act as a stabilizing element for the magnetic compass, the same may be considered the control or gyro unit of the artificial horizon.

One of the objects of the invention is to provide an instrument for use on aircraft from which bank, horizon and azimuthal position indications may be obtained.

Another object of the invention is to provide an instrument in which the magnetic compass element is stabilized to eliminate northerly turning error therein.

A further object of the invention is to provide an instrument of this character which is approximately of the same dimensions as a standard directional gyro instrument.

One of the features of the invention consists in utilization in the instrument of a gyro vertical having a rotor bearing case which includes an underslung frame.

Another feature of the invention resides in the provision of a C-shaped gimbal ring as a particular support mounting means for the gyro vertical which is axially disposed within the outer casing of the instrument in 45 degree angular relation to the fore and aft axis of the craft, the advantages of which are hereinafter pointed out.

Still a further feature of the invention is contained in the provision of an instrument of this character which may have a magnetic compass element with both a top and side reading card.

Other objects, features, and structural details of the invention will be apparent from the following description when read in connection with the accompanying drawing, wherein Fig. 1 is a plan view of the operating parts of an instrument constructed in accordance with the present invention with the outer casing for the same being shown in section.

Fig. 2 is a detail view of the rotor bearing case and magnetic compass parts, the left-hand portion of which is shown in elevation and the right-hand portion of which is shown in vertical section.

Fig. 3 is a front elevation showing the indicating face of the instrument, and

Fig. 4 is a further view of the face of the instrument.

With reference to Fig. 1 of the drawing, the operating parts of the improved instrument are shown enclosed within a suitably evacuated casing 10, the front portion of which includes a window 11 through which the observer looks to obtain the indications given by the instrument. The planar front wall of the casing of the instrument is secured to the instrument panel 12 of the craft in which the device is used. In the illustrative form of the invention shown in the drawing, the rear portion of casing 10 includes a flange 13 which provides a holding piece for an air filter 14. Air is continuously supplied the instrument from the atmosphere to be employed in the instant embodiment of the device to provide the energy required to spin the gyro rotor and also to maintain the spin axis of the rotor in a properly erected or vertical position. Other means may obviously be employed for performing these functions, if desired, without departing from the inventive concepts herein disclosed.

One of the features of the invention resides in the location of the gimbal axis of support of the gyro instrument within the casing 10 so that attitude indications can be obtained directly from the gyro rotor bearing case without the use of the mechanical linkage now employed in this connection. As shown in Fig. 1, the gimbal ring 15 provided is C-shaped to leave an opening in the same adjacent the window 11 so that the view of the rotor bearing case or the compass card thereon, as hereinafter described, is unobstructed. The ring has substantially one quarter of its circumference or perimeter cut away to provide this opening. To provide a two trunnion mounting for the ring 15 within the casing 10, and still leave the required opening therein, the ring is disposed in the casing with its axis displaced in 45° angular relation to a horizontal line situated in the plane of the front face of the instrument or to the fore and aft axis of the craft. The position of this axis with relation to the instrument is indicated by the arrow, in Fig. 1, shown at 16. One end of the gimbal ring 15 is pivotally mounted within the casing 10 by means of a hollow trunnion 17 and bearing 18 and the opposite end is provided with a similar mounting formed of trunnion 19 and bearing 20. The described ring provides the major pivotal axis of universal support for the rotor bearing case of the instrument hereinafter described. An air passageway 21 is formed in a boss 22 in the casing 10 by which communication is made between the flange 13 provided opening 23 to the back of the filter 14 and the hollow trunnion 17. A further air passageway or channel 24 is situated in the gimbal ring 15 proper which connects hollow trunnion 17 with the hollow trunnion 25 included as a portion of the minor pivotal axis mounting means of the illustrated type of universal support employed in the present instance for the rotor bearing case of the instrument.

In accordance with the present invention, the gyro rotor bearing case 26, Fig. 2, is pivotally mounted in the ring 15 by means of an underslung frame 27 from one end of which hollow trunnion 25 extends. Frame 27 is preferably U-shaped and may either form a part of the rotor bearing case 26 or be a separate piece to which the case is rigidly secured. As shown, the frame is pendant and the case is fixed to the base thereof. The minor axis of universal support for the rotor bearing case 26 is further constructed to include bearing 28 for trunnion 29 and the oppositely disposed trunnion 29 and bearing 30 in the gimbal ring 15. It will be understood that the thereby formed minor axis is arranged in perpendicular relation to the major pivotal axis of the universal support provided by the gimbal ring 15. The underslung rotor case is consequently universally mounted within said outer casing 10 with an opening between the case and the window or front face of the outer casing.

The gyro rotor, as indicated at 31, is pivotally supported within the rotor case 26 by means of bearings 32 and 33 so that the spin axis thereof is normally vertical. Buckets 34 are located in the periphery of the rotor 31 and air is directed against the same from one or more nozzles 35 formed in the case 26 and supplied with air by way of the connecting air channels 36, in the case, and 37 in the underslung frame 27. The used air is exhausted from the rotor bearing case 26 by way of passageways 38 and through the controlled ports 39 in the erecting member 40 for the gyro vertical. Air issuing from the ports 39 is continuously evacuated from the outer casing 10 by way of the pipe connection 41 through means of a suitable device (not shown) for accomplishing this purpose. The erecting means illustrated is of a conventional type in which cooperating pairs of gravitationally responsive pendulums 42 and 43 differentially intercept the air issuing from the ports 39 in the body of the erecting device which is mounted on the bottom of the rotor bearing case. Upon relative inclination of the pendulous members 42 and 43 and the rotor bearing case 26, a torque is exerted about either of the axes of universal support of the case to correct such inclination and restore the case so that the spin axis of the gyro rotor 31 is maintained in a vertical position. Other erecting means other than that illustratively depicted in Fig. 2 may obviously be employed in connection with the invention without departing from the inventive concepts herein disclosed.

When considered generally the gyro rotor bearing case 26 provides the gyro stabilizing element for a magnetic compass element which is pivotally mounted on the case 26. This compass element is provided in the present instance by a card 44 in the shape of an inverted cup having on the tip of the same two spaced permanent magnets 45 by which the element is given direction seeking properties. The card 44 is further formed to include top reading indications as designated at 46. A window (not shown) is provided in the top wall of the casing 10 so the observer may see the top reading portion of the gyro stabilized compass card 44. Further in this connection, the card 44 is mounted in coaxial relation to the spin axis of the gyro rotor 31 by means, in this instance, of a vertically extending bearing post 48 fixed to the case 26 and a cooperating tubular member 49 fixed to the card 44. Post 48 forms a jewel support for the card which is confined thereon by a stop piece 48'. Swinging movement of the card on the jewel support is presented by a number of radially disposed limit members 50 situated in the tubular member 49.

The side reading directional indications 47 of the cup-shaped compass card 44 are observed in connection with a lubber line forming rod 51 which extends in a vertical direction outside the card and is fixed to the frame 27. An attitude indicating equatorial ring 52 is included with this portion of the card, the ring being arranged in a position thereon, due to the underslung frame support of the rotor case, to intersect the minor axis of universal support of the gyro rotor bearing case of the instrument. If the instrument were to be used solely for artificial horizon providing purposes, the equatorial ring could be placed directly on the rotor bearing case and the magnetic compass element eliminated. Also, if desired, a partial card similar to compass card 44 could be fixed in position on the rotor bearing case and a reference line placed thereon in the manner noted for equatorial ring 52. The horizon reference indicating member whether considered as ring 52 or an equivalent line is positioned in accordance with the provisions of the present invention to be normally in the horizontal plane defined by the respective major and minor axes of universal support provided the gyro rotor bearing case. Line 52 intersects the axis of the underslung frame mounted rotor case at two points.

Comparison lines 53, for the horizon reference line 52, are situated on a conically shaped mask 54, located to the rear of window 11, having an opening 55 therein. The mask 54 may also include lubber lines 56 vertically located thereon against which relative inclination of the compass card's reference rod 51 may be compared by the observer. It will be understood that conditions of pitch and bank of the craft are observed by comparison of reference indication line 52 with respect to lines 53. As shown in Fig. 3, the attitude indicating instrument depicts conditions of straight level flight of the craft. In Fig. 4, the attitude of the craft is shown by the instrument to be in a banked position and neither ascending or descending. When the instrument is employed as a flight indicator or gyro stabilized magnetic compass, the side reading compass card indications 47 are also observable through the opening 55 in the mask 54 in comparison with the lubber line forming rod 51. The azimuthal position or heading of the craft as shown by the instrument dial in both Figs. 3 and 4 is noted as due North. Due to the fact that the card 44 and the attitude indicating equatorial line 52 thereon peripherally surrounds the rotor bearing case, the instrument indicates attitude and heading at all times. The fluid directing nozzles 35 may be situated in a plane which intersects the axis of the underslung rotor case frame 27. In this connection, the compass element is symmetrically balanced about its pivotal axis of support on the rotor bearing case. An instrument of this character in which the gimbal axes of the gyro case are positioned midway between or about 45° to the normal roll and pitch axes of the casing, (i. e., the fore and aft and athwartship axes of the craft), possesses the advantage of permitting 360° roll or pitch of the craft on which it is mounted (i. e., barrel rolls and loops)

without disturbance of the gyro. The explanation for this advantage is probably that the gimbal ring axis and the rotor case axis of the instrument are less likely to align themselves with the spin axis of the gyro rotor which is the main cause of the condition known as "gimbal lock" which results in flipping the gyro hindside foremost.

To avoid inductive magnetic coupling between the closely associated compass magnets 45 and the spinning rotor 31, the rotor is constructed of a non-metallic or other inert material. The rotor utilized may be of the non-inductive type particularly shown and described in copending application Serial No. 434,771, filed March 14, 1942, in the name of F. D. Braddon. Non-magnetic ball bearings are used throughout the rotor and gimbal supports. Oscillatory movements of the compass card are damped in the present instrument by means of the inductive magnetic coupling between the magnets 45 and the portion of the relatively stationary gyro rotor bearing case located directly beneath the magnets.

As many changes could be made in the above construction and many apparently different embodiments of this invention could be made without departing from the scope thereof, it is intended that all matter contained in the above description or shown in the accompanying drawing shall be interpreted as illustrative and not in a limiting sense.

What is claimed is:

1. In an attitude indicating instrument, a gyro vertical having a casing with a window in the front wall thereof, a C-shaped gimbal ring, with one-quarter of its circumference cut away to provide an opening, having diametrically aligned pivots supporting the same for movement relative to the casing, one of such pivots being located at one end of the open ring, an attitude reference providing rotor case with diametrically aligned pivots supporting the same for movement relative to the ring, one of such pivots being located at the other end of the open ring, said rotor case being universally mounted in the casing with the opening in the ring adjacent the window.

2. A flight indicator for aircraft comprising the combination of, an artificial horizon and magnetic compass including, a casing having a window in the front wall thereof, a C-shaped gimbal ring the opening in which is substantially one-quarter of its circumference, means mounting the ring for pivotal movement relative to the casing, a gyro rotor case, an underslung frame fixed to the case, means mounting the frame for pivotal movement relative to the ring, the respective pivot means for the ring and frame defining axes that are normally horizontal and mutually perpendicular, said magnetic compass having a side reading card rotatably mounted on said case and peripherally surrounding the case, and a horizon reference providing equatorial line situated on said card at a position in which the line normally intersects the axes of the respective pivot means, said card being visible at the window through the opening in the ring.

3. In a flight indicator for aircraft, a casing having a window therein, a gimbal ring with an opening therein adjacent the window, means for pivotally supporting said ring in said casing, a gyro rotor case, a pendant, U-shaped frame fixed at its base to the case and pivotally mounted at the ends thereof on the ring, a magnetic compass including a card rotatably mounted on said case, said card surrounding the case and extending to a position below the axis of the frame on said ring.

4. A flight indicator as claimed in claim 3, in which said gimbal ring is C-shaped and the opening therein is substantially one-quarter of its circumference.

5. A gyro stabilized magnetic compass comprising a casing having a window in the front wall thereof, a gimbal ring mounted in the casing having an opening therein adjacent the window, a gyro rotor case, a pendant U-shaped frame fixed at its base to the case and pivotally mounted at the ends thereof on said ring with the axis thereof normal to the axis of the ring, a non-inductive gyro rotor mounted in said case to spin about a normally vertical axis, a side reading compass card, mounted on the case to pivot about an axis coincident with the axis of the rotor, surrounding the case and extending to a position below the axis of the frame on the ring, said card being visible at the window through the opening in the ring.

6. A stabilized compass as claimed in claim 5, in which said card is formed in the shape of an inverted cup that is pivotally mounted on a post situated on the top of the rotor case.

7. A gyro stabilized magnetic compass comprising the combination of a gyro vertical including a casing, a C-shaped gimbal ring mounted in said casing for pivotal movement about an axis, a rotor bearing case, an underslung frame supporting said case and pivotally mounted on said ring on an axis normal to the axis of said ring, a non-inductive gyro rotor mounted in said case, air jet means in said case for spinning said gyro rotor, and a magnetic compass having a card mounted on said case for pivotal movement about a normally vertical axis, said air jet means being situated to direct air in a normally horizontal plane that includes the axis of the underslung frame on said ring.

8. In an attitude indicating instrument, a gyro vertical having a casing with a planar front wall, a window in said front wall, a C-shaped gimbal ring in which the opening therein is substantially one-quarter of its circumference, diametrically aligned pivots mounting the ring for movement relative to the casing with one of the pivots situated at one end of the open ring, an attitude reference providing rotor case, diametrically aligned pivots for mounting the case for movement relative to the ring with one of the pivots situated at the other end of the open ring, said rotor case being universally mounted in the casing with the opening in the ring adjacent the window.

9. An instrument as claimed in claim 8, in which the diametrically aligned pivots of the ring define an axis that is arranged in 45° angular relation to a horizontal line situated in the plane of the front wall of the casing.

10. An instrument as claimed in claim 8, in which the diametrically aligned pivots of the case define an axis that is normally arranged in 45° angular relation to a horizontal line situated in the plane of the front wall of the casing.

LESLIE F. CARTER.